April 19, 1932.  L. N. TALKES ET AL  1,854,868
DEVICE FOR AUTOMATICALLY STOPPING THE MOTOR OF AN AUTOMOBILE
Filed June 26, 1930
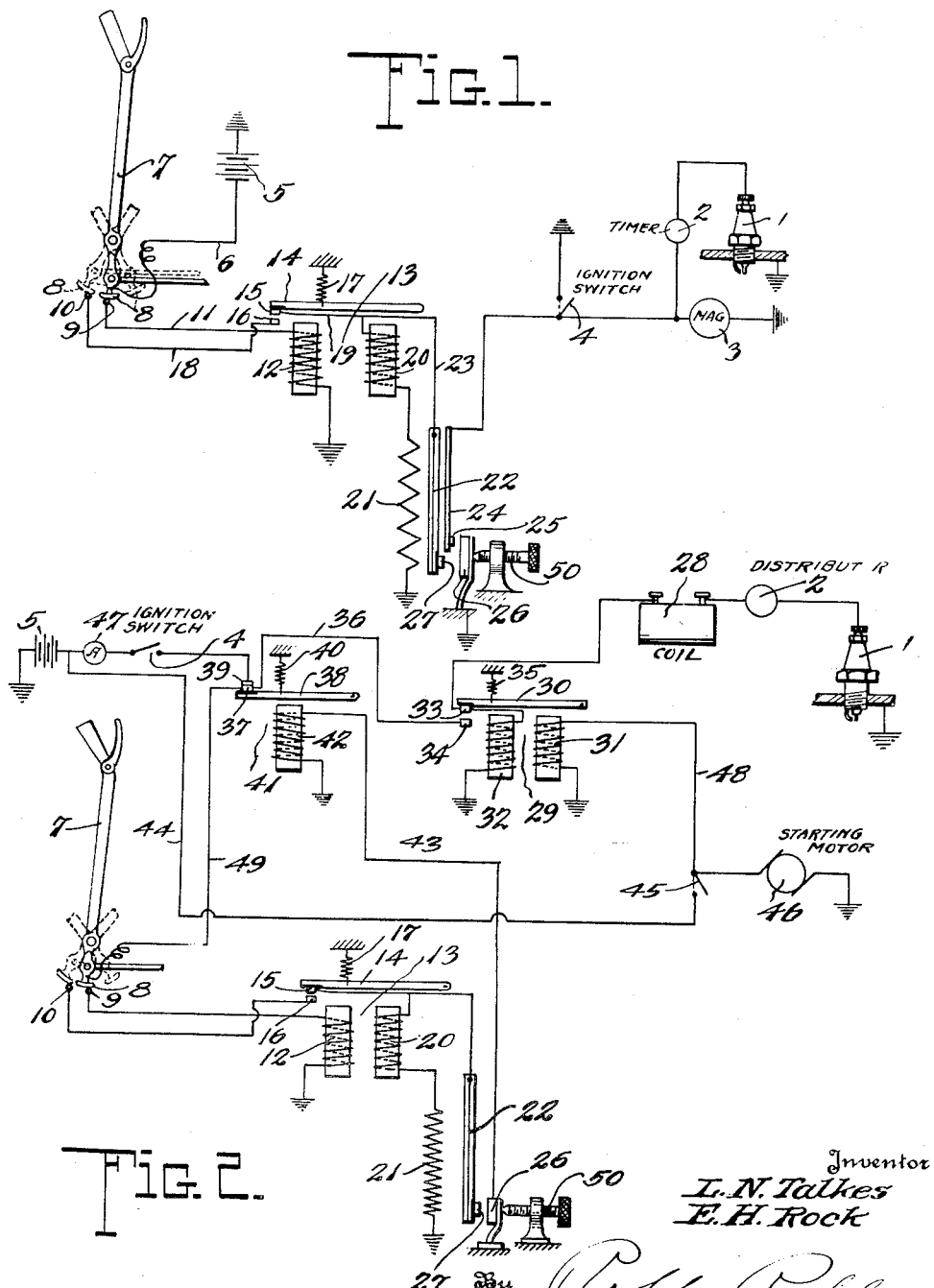

Patented Apr. 19, 1932

1,854,868

UNITED STATES PATENT OFFICE

LOUIS N. TALKES AND EDMOND H. ROCK, OF CLEVELAND, OHIO

DEVICE FOR AUTOMATICALLY STOPPING THE MOTOR OF AN AUTOMOBILE

Application filed June 26, 1930. Serial No. 464,007.

This invention relates to ignition control means and more particularly to an automatic control for preventing needless idling of engines. The invention is primarily adapted for use with automobile internal combustion engines, but it is to be understood that it is not confined to such use since the principle may be applied to many other devices wherein it is desired to start or stop the said devices after a predetermined time interval.

One of the most serious objections to the use of automobiles is the creation of poisonous gases which, if breathed in sufficient quantities for a comparatively short period of time, will result in immediate death or will impair the health to such an extent that death ultimately results. The rapid and continuous increase in the use of automobiles has made this a very great problem, and particularly is it true in the city with its crowded and congested conditions where the poisonous gases are not as readily dispersed as in the open country.

These poisonous gases given off by the automobile engines are created by virtue of incomplete combustion of the fuel, thereby forming carbon monoxide. Buses, taxicabs and delivery autos are particularly contributive to the formation of carbon monoxide since the fuel mixture introduced into the cylinders of the engines of these vehicles is very rich to produce a quick pick-up in starting from a standstill, these vehicles stopping and starting up more frequently than the average pleasure automobile. The rate of formation of carbon monoxide is considerably more rapid when the engine is idling. To a company employing a large number of delivery automobiles, the present invention would effect a considerable saving since it is the general custom for the drivers to allow the engine to idle while making deliveries. Many devices of various kinds have been proposed to eliminate the poisonous gases or destroy their poisonous character, but these devices have not been very universally accepted by the public owing to their comparatively high cost and difficulty of attachment.

Forgetfulness in stopping the motor of an automobile has very frequently resulted in asphyxiation of the driver when the automobile is in a closed building, such as a garage. Also, many people through ignorance or purposely and carelessly run the engine while in the garage to make various adjustments or for other reasons, thereby breathing the deadly gases and becoming unconscious before they are aware of their presence.

It is an object of the present invention to provide a safety device which will automatically operate after a predetermined length of time of idling to stop the engine, such device being easily installed, simple in construction and operation, and inexpensive in price.

A further object of the invention is to cause the automatic control to become operative incident to operation of certain of the automobile control means, preferably the emergency brake. However, it is to be understood that the device is not to be limited to use in conjunction with the emergency brake.

A still further object is the provision of an electric control means which automatically renders the automobile ignition system inoperative after a predetermined period of idling of the engine.

Another object of the invention is to provide a relay control having one or more relays, certain of the relays having a closing coil and a separate holding coil for the armature, the closing coil becoming operative upon an initial movement of certain of the automobile controls, and the holding coil becoming operative upon further movement of certain of the controls, the closing coil being then rendered inoperative.

Another object is to provide a thermostat which becomes operative upon closing of a main relay, said thermostat being adapted to function after a predetermined period of time to render the automobile ignition system inoperative and release the relays.

Other and further objects and advantages of the invention will be hereinafter set forth and the novel features thereof defined by the appended claims.

In the drawings:

Fig. 1 is a diagrammatic illustration of the usual automobile magneto ignition system having the present invention included therein; and Fig. 2 is a diagrammatic illustration of the usual automobile battery ignition system with the invention applied thereto.

Like reference characters refer to corresponding parts in the several figures of the drawings.

Referring to Fig. 1, 1 denotes a spark plug or other suitable means for igniting the combustion charge of an engine, the said spark plug being connected to the usual timer or distributor 2. It is to be understood that any number of spark plugs may be used, depending upon the number of engine cylinders, the timer or distributor causing them to function in the proper sequence. 3 designates the magneto which is connected to the distributor on one side and grounded on the other side, thereby establishing a circuit through the distributor and plugs to the engine head ground. In order to stop the engine, the usual ignition switch 4 is provided which is adapted to be closed to ground or short circuit the magneto.

Up to this point, the devices and circuits are of the conventional type. The present invention, which constitutes a safety device for this circuit, includes a battery 5 which may be of any desired type, such as a storage battery (or dry cells may be used if the automobile is not provided with a storage battery) the said battery having one side grounded and the other side connected through lead 6 to the desired automobile control, preferably the emergency brake 7. The emergency brake is provided with a suitable brush or wiper member 8 which is adapted to engage the contact points 9 and 10 in succession. Preliminary movement of the brake connects the battery 5 through lead 6, wiper 8, contact point 9, lead 11, solenoid 12, to ground. Solenoid 12 constitutes the closing solenoid of relay 13. Armature 14, carrying contact 15 adapted to engage contact 16, is normally held in position by springs 17 to prevent contacts 15 and 16 from engaging each other. The energizing of solenoid 12 by the preliminary movement of the brake attracts the armature 14 to bring the contacts 15 and 16 into engagement, whereupon further movement of the brake 7 will cause the circuit to be established from the battery 5, through lead 6, wiper 8, contact 10, lead 18, contact 16, contact 15, lead 19, solenoid 20, resistance or heating coil 21, to ground. Solenoid 20 constitutes a holding solenoid, since the circuit to the closing solenoid 12 is broken by the further movement of the brake 7.

Upon closing of the relay 13, the thermostat element or bimetallic strip 22 is connected through the lead 23 to the battery. The action of the heat from the heating coil or resistance 21 causes the bimetallic strip 22 to deform and press the spring member 24 carrying contact 25 against the stationary or fixed contact 26, the latter being connected to ground, thereby short circuiting the magneto and stopping the engine in a similar manner to the operation of the ignition switch 4. Continued deformation of the bimetallic strip 22 causes contact 27 to engage 26 and short circuit or by-pass the solenoid 20 and heating coil 21, thereby permitting the relay 13 to open and disengage contacts 15 and 16.

Referring to Fig. 2, the spark plug 1, distributor 2 and induction coil 28 are of the usual type and are connected in circuit with a relay 29 having an armature 30, closing solenoid 31, holding solenoid 32, contacts 33 carried by the armature, and 34 associated therewith. Contacts 33 and 34 are normally held out of engagement by a spring 35 attached to the armature 30. In circuit with contact 34, through lead 36, is a contact 37 carried by an armature 38 of relay 41, said contact being normally maintained in engagement with contact 39 by means of the spring 40 attached to the armature 38. 42 denotes a solenoid associated with armature 38 for opening the circuit at contacts 37 and 39, said solenoid being grounded at one side and connected through lead 43 to fixed contact 26 associated with the bimetallic strip 22 carrying contact 27.

A connection from battery 5 through lead 44 is made to the starter switch 45, which is adapted to control the starter motor 46. Relay 13 is controlled by the emergency brake 7, as explained with reference to Fig. 1.

The operation of the system of Fig. 2 is as follows: The ignition switch 4 is first closed and the starter switch 45 is operated to start the engine. The current flows from the battery 5, through lead 44, starter switch 45, lead 48, to solenoid 31, thereby closing the contacts 33 and 34 of relay 29 and permitting the current to flow from the battery 5, through armature 47, ignition switch 4, contacts 39 and 37 of relay 41 (these contacts being normally held in engaged position) through lead 36, contacts 34 and 33 of relay 29, to the induction coil 28, distributor 2 and spark plugs 1. Initial movement of the emergency brake 7 causes current to flow from battery 5, through armature 47, ignition switch 4, contacts 39 and 37, lead 49, wiper 8, contact 9, and solenoid 12, thereby closing relay 13 and causing contacts 15 and 16 to engage each other. Continued movement of the brake causes solenoid 20 to become energized, as in Fig. 1, and connect the heating coil 21 and the bimetallic member 22 in circuit. Deformation of the bimetallic member causes contact 27 to engage 26 and energize solenoid 42 of relay 41, through lead 43, thereby attracting armature 38 and opening the circuit established by contacts 39 and 37. Opening of this circuit interrupts the flow of current through lead 36, contacts 34 and 33, to solenoid 32 of relay 29, thereby releasing the armature 30 and breaking the circuit to the induction coil, distributor and plugs, and stopping the engine. The engagement of contacts 27 with 26 also short circuits or by-passes solenoid 20 of the main relay 13 and resistance 21 to release armature 14, as explained in connection with Fig. 1.

Contacts 26 in each of the systems may be provided with an adjusting means denoted generally by 50, to vary the time interval between the operation of the brake and the stopping of the engine.

While the specific details of construction have been herein shown and described, the invention is not confined thereto as changes and alterations may be made without departing from the spirit thereof as defined by the appended claims.

Having thus described our invention, what we claim as new and desire to secure by Letters Patent is:

1. In a device of the class described, the combination with a motor vehicle braking means and an ignition system, of means operable by said braking means for rendering said ignition system inoperative after a predetermined time interval.

2. In a device of the class described, the combination with a motor vehicle emergency brake means and an ignition system, of a relay associated with said ignition system, a thermostat controlled by said relay, contact means associated with said brake means for controlling said relay, and means associated with said thermostat for rendering said ignition system inoperative at a predetermined time subsequent to the operation of said vehicle brake means.

3. In a device of the class described, the combination with a motor vehicle ingition system including a source of potential, of manually controlled means for automatically rendering said ignition system inoperative after a predetermined time interval, said means including a relay normally maintained in open circuit condition, a closing solenoid for said relay, a holding solenoid for said relay, a bimetallic member associated with said relay, a heating coil associated with said bimetallic member and with said relay, contact means associated with said manual control for energizing said closing solenoid incident to preliminary movement of said control and for energizing said holding solenoid incident to continued movement of said control whereby to connect said source of potential through the relay to the said heating coil, and contact means associated with said bimetallic member for causing said ignition system to become inoperative and for restoring said relay to normal position incident to deformation of said bimetallic member.

4. In a device of the class described, the combination with a motor vehicle ignition system including a source of potential, of manually controlled means for automatically rendering said ignition system inoperative after a predetermined time interval, said means including a relay normally maintained in open circuit condition, a closing solenoid for said relay, a holding solenoid for said relay, a bimetallic member in circuit with said relay, a heating coil associated with said bimetallic member and with said relay, contact means associated with said manual control for energizing said closing solenoid incident to preliminary movement of said control and for energizing said holding solenoid incident to continued movement of said control whereby to connect said source of potential through a portion of the relay to the said heating coil, contact means associated with said bimetallic member for causing said ignition system to become inoperative and for restoring said contact means to normal position incident to deformation of said bimetallic member, and means for varying the time interval between the operation of said manual control and the rendering of the ignition system inoperative.

5. In a device of the class described, the combination with a motor vehicle ignition system including a source of potential, of a relay having a closing solenoid and a holding solenoid, manually operable means for successively energizing said solenoids, a bimetallic member associated with said relay, a heating coil associated with said bimetallic member and adapted to be energized incident to the energizing of said solenoids, and contact means associated with said bimetallic member for rendering said ignition system inoperative incident to deformation of said bimetallic member.

6. In a device of the class described, the combination with a motor vehicle ignition system and braking means for said vehicle, of full automatic means for rendering said ignition system inoperative after a predetermined time interval incident to the operation of said braking means, said automatic means including means for automatically restoring said ignition system to starting condition.

In testimony whereof we affix our signatures.

LOUIS N. TALKES.
EDMOND. H. ROCK.